US012811772B2

(12) United States Patent
Choi et al.

(10) Patent No.: US 12,811,772 B2
(45) Date of Patent: Nov. 24, 2026

(54) APPARATUS AND METHOD WITH HOMOMORPHIC ENCRYPTION OPERATION

(71) Applicant: SAMSUNG ELECTRONICS CO., LTD., Suwon-si (KR)

(72) Inventors: Rakyong Choi, Suwon-si (KR); Andrey Kim, Suwon-si (KR); Yongwoo Lee, Suwon-si (KR); Hyungchul Kang, Suwon-si (KR); Sunmin Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 18/625,437

(22) Filed: Apr. 3, 2024

(65) Prior Publication Data

US 2024/0340158 A1 Oct. 10, 2024

(30) Foreign Application Priority Data

Apr. 10, 2023 (KR) ........................ 10-2023-0046943
Jul. 14, 2023 (KR) ........................ 10-2023-0091898

(51) Int. Cl.
*H04L 9/00* (2022.01)
*H04L 9/06* (2006.01)

(52) U.S. Cl.
CPC ................ *H04L 9/008* (2013.01); *H04L 9/06* (2013.01)

(58) Field of Classification Search
CPC .................................. H04L 9/008; H04L 9/06
See application file for complete search history.

(56) References Cited

U.S. PATENT DOCUMENTS

| | | | | |
|---|---|---|---|---|
| 9,246,675 | B2 | 1/2016 | Ding | |
| 10,541,805 | B2 * | 1/2020 | Laine | H04L 9/008 |
| 11,277,256 | B2 * | 3/2022 | Kim | H04L 9/008 |
| 11,277,257 | B2 * | 3/2022 | Kim | H04L 9/008 |
| 11,558,171 | B2 * | 1/2023 | Lee | H04L 9/008 |
| 12,143,466 | B2 * | 11/2024 | Micciancio | H04L 9/008 |
| 12,143,467 | B2 * | 11/2024 | Joye | H04L 9/3026 |
| 12,155,746 | B1 * | 11/2024 | Crockett | G06F 17/16 |
| 12,184,771 | B2 * | 12/2024 | Eom | H04L 9/3093 |
| 12,238,207 | B2 * | 2/2025 | Liu | H04L 9/3239 |
| 12,362,905 | B2 * | 7/2025 | Park | H04L 9/0618 |

(Continued)

FOREIGN PATENT DOCUMENTS

| | | |
|---|---|---|
| CN | 108923907 A | 11/2018 |
| CN | 115150094 A | 10/2022 |

(Continued)

*Primary Examiner* — Viral S Lakhia
(74) *Attorney, Agent, or Firm* — NSIP Law

(57) ABSTRACT

Disclosed is a homomorphic encryption operation apparatus and method. The homomorphic encryption operation method is performed by a computing device that includes processing hardware and storage hardware, and the method includes: receiving, and storing in the storage hardware, a ciphertext including modules; receiving, and storing in the storage hardware, an operation key including a relinearization key corresponding to the ciphertext; and performing, by the processing hardware, a homomorphic encryption operation on the ciphertext, wherein a modulus of the ciphertext is determined by the processing hardware based on a dimension of the modules and a number of the modules.

18 Claims, 9 Drawing Sheets

(56) References Cited

U.S. PATENT DOCUMENTS

| | | | | |
|---|---|---|---|---|
| 12,380,227 | B2 * | 8/2025 | Lee | G06F 21/602 |
| 12,438,710 | B2 * | 10/2025 | Lee | H04L 9/0861 |
| 2018/0375640 | A1 * | 12/2018 | Laine | H04L 9/008 |
| 2021/0399874 | A1 * | 12/2021 | Polyakov | H04L 9/085 |
| 2023/0188322 | A1 * | 6/2023 | Bajpeyi | H04L 9/008 |
| 2024/0267222 | A1 * | 8/2024 | Chillotti | H04L 9/008 |
| 2024/0333478 | A1 * | 10/2024 | Shim | H04L 9/3263 |

FOREIGN PATENT DOCUMENTS

| | | | |
|---|---|---|---|
| EP | 4 050 471 | A1 | 8/2022 |
| KR | 10-1861089 | B1 | 5/2018 |

* cited by examiner

APPARATUS AND METHOD WITH HOMOMORPHIC ENCRYPTION OPERATION

CROSS-REFERENCE TO RELATED APPLICATIONS

This application claims the benefit under 35 USC § 119 (a) of Korean Patent Application No. 10-2023-0046943 filed on Apr. 10, 2023, and Korean Patent Application No. 10-2023-0091898 filed on Jul. 14, 2023, in the Korean Intellectual Property Office, the entire disclosures of which are incorporated herein by reference for all purposes.

BACKGROUND

1. Field

The following description relates to an apparatus and method with a homomorphic encryption operation.

2. Description of Related Art

In 2014, Ducas and Micciancio introduced the Fastest Homomorphic Encryption in the West (FHEW) encryption, which is a completely homomorphic encryption scheme. Homomorphic encryption is a promising encryption method that enables operations to be performed on encrypted data while preserving the decryptability of the operation-transformed encrypted data. An arbitrary operation may be performed on a homomorphic-based ciphertext (of an original plaintext), transforming the ciphertext, and yet the operation-transformed ciphertext can be decrypted to operation-transformed plaintext, which is equivalent to the having performed the operation on the original plaintext. That is, homomorphic encryption may be used to allow operations to be performed on encrypted data without the data being decrypted. Homomorphic encryption schemes are typically based on lattices, and may thereby be resistant to quantum algorithms and be safely relied on.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a homomorphic encryption operation method is performed by a computing device that includes processing hardware and storage hardware, and the method includes: receiving, and storing in the storage hardware, a ciphertext including modules; receiving, and storing in the storage hardware, an operation key including a relinearization key corresponding to the ciphertext; and performing, by the processing hardware, a homomorphic encryption operation on the ciphertext, wherein a modulus of the ciphertext is determined by the processing hardware based on a dimension of the modules and a number of the modules.

The performing of the homomorphic encryption operation may include changing a ciphertext on a first modulus to a ciphertext on a second modulus.

The changing of the ciphertext may include: determining a number of modules corresponding to the second modulus; and changing the ciphertext on the first modulus to the ciphertext on the second modulus based on the second modulus, the dimension of the modules, and the number of the modules.

The determining of the number of the modules corresponding to the second modulus may be based on the dimension of the modules.

The performing of the homomorphic encryption operation on the ciphertext may include: based on determining that the modulus of the ciphertext has changed to a preset value or less, performing an operation of reducing the number of the modules.

The receiving of the operation key may include: receiving a module rank reduction key, and wherein the performing the operation of reducing the number of the modules includes: changing a secret key corresponding to the ciphertext based on the module rank reduction key.

The changing the secret key may include performing an operation of reducing the number of components constituting the secret key.

In another general aspect, a homomorphic encryption operation method performed by a computing device includes: obtaining a required number of times of performing homomorphic operations for a homomorphically encrypted ciphertext; determining a modulus of the ciphertext based on the required number of times of performing the homomorphic operations; determining a dimension of modules included in the ciphertext and a number of the modules, based on the modulus of the ciphertext; generating the ciphertext based on the modulus, the dimension of the modules, and the number of the modules; and generating an operation key including a relinearization key.

The generating of the ciphertext may include: encoding a message to be encrypted; and homomorphically encrypting the encoded message.

The encoding may include mapping the message, which is in a complex number domain, to a polynomial.

The ciphertext may be encrypted with a module learning with errors (MLWE) encryption scheme, and the method may further include reducing the computation needed to perform the homomorphic encryption operation by reducing the number of the modules.

In another general aspect, a computing device includes one or more processors and memory storing instructions configured to cause the one or more processors to: access a ciphertext including modules and an operation key including a relinearization key; and perform a homomorphic encryption operation on the ciphertext, wherein a modulus of the ciphertext is determined based on a dimension of the modules and a number of the modules.

The instructions may be further configured to cause the one or more processors to: perform an operation of changing a ciphertext on a first modulus to a ciphertext on a second modulus.

The instructions may be further configured to cause the one or more processors to: determine a number of modules corresponding to the second modulus; and change the ciphertext on the first modulus to the ciphertext on the second modulus based on the second modulus, the dimension of the modules, and the number of the modules.

The instructions may be further configured to cause the one or more processors to: determine the number of the modules corresponding to the second modulus based on the dimension of the plurality of modules.

The instructions may be further configured to cause the one or more processors to: based on determining that the modulus of the ciphertext has changed to being less than a preset value, perform an operation of reducing the number of the modules.

The instructions may be further configured to cause the one or more processors to: receive a module rank reduction key, and change a secret key corresponding to the ciphertext based on the module rank reduction key.

The instructions may be further configured to cause the one or more processors to: perform an operation of reducing the number of components constituting the secret key.

Other features and aspects will be apparent from the following detailed description, the drawings, and the claims.

Figure 1A:
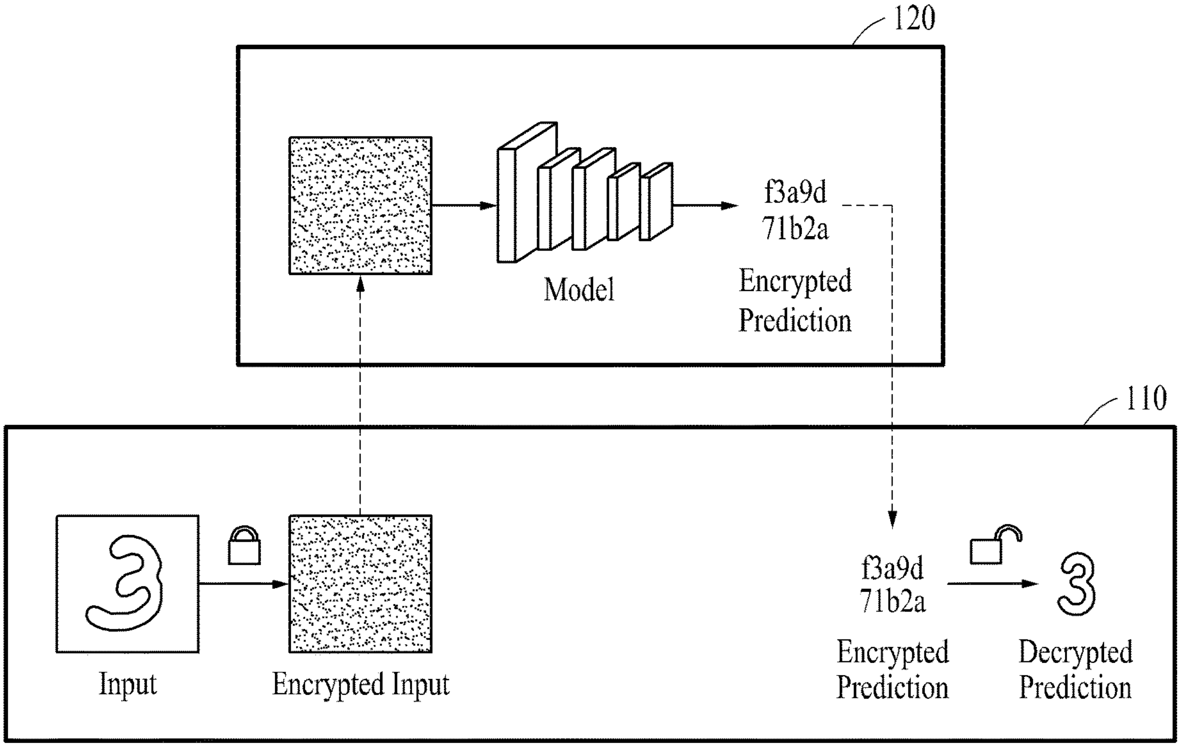
FIG. 1A illustrates an example homomorphic encryption operation system according to one or more example embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1A illustrates an example homomorphic encryption operation system according to one or more example embodiments.

Referring to FIG. 1A, a homomorphic encryption operation system according to an example may include a client 110 and a server 120 that may have a communication connection (e.g., local network, bus, cellular, Internet, etc.)

to exchange messages through any of various protocols. It will be appreciated that homomorphic encryption, as between a client and a server, has numerous practical applications. For example, the client 110 may be able to encrypt plaintext to a homomorphic ciphertext, transmit the ciphertext to the server 120, which in turn may perform an operation on the ciphertext and return the operation-transformed ciphertext to the client 110. The client 110 may then decrypt the operation-transformed ciphertext (from the server 120) to derive the plaintext as though the server 120's operation had been performed on the plaintext (i.e., derive the operation-transformed plaintext).

The homomorphic encryption operation system may be configured to perform encryption and decryption using homomorphic encryption. As used herein, homomorphic encryption refers to an encryption scheme of allowing various operations to be performed on data with the data in an encrypted state, while preserving decryptability of the encrypted data (even after transformative operations are performed thereon). To reiterate, in a homomorphic encryption scheme, an operation result obtained from an operation performed using ciphertexts may be a new ciphertext, and a plaintext obtained by decrypting the ciphertext may be the same as an operation result from an operation on original data which is data before being encrypted.

For example, the client 110 may generate a ciphertext ct(m) by encrypting a message m and may then transmit the ciphertext to the server 120. The message m may be an encoding of an original plaintext. The server 120 may perform various transformative operations on the ciphertext in its encrypted state and may transmit a corresponding operation result ct(f(m)) to the client 110. The client 110 may perform decryption on the operation result, and a plaintext f(m) obtained by the decryption on the ciphertext may be the same as an operation result of original data before being encrypted.

Encrypted data or encrypted text may be referred to herein as a ciphertext. The ciphertext may be in the form of a polynomial or a vector including a polynomial (typically as a polynomial/vector "representation", which is an ordering of numbers where each number is a coefficient of a polynomial term and its position indicates the exponent of the its term).

The homomorphic encryption operation system may part of a larger system that includes other devices and services that each employ the same homomorphic encryption scheme and thus are capable of interoperation. According to some embodiments, the client 110 may be a device configured to perform key generation, encryption, and decryption, and may be implemented in a personal computer (PC), a portable device, or any other form of computing device.

The portable device, in such a case, may be for example, a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal or portable navigation device (PND), a handheld game console, an e-book reader, or a smart device, to name some examples. The smart device may be, for example, a smartwatch, a smart band, or a smart ring.

According to some embodiments, the server 120 is a device configured to perform operations such as addition and multiplication between encrypted data, in a software server, for example. The server 120 may also be referred to herein as a homomorphic encryption operation apparatus.

Although mathematical language and notation is used herein to describe some features and operations, the mathematical language/notation is merely a convenient language with which to describe properties of physical circuits and/or instructions. One may readily use the mathematical language/notation as a guide for configuring source code and/or high-level circuit description in software/circuit development tools, which in turn may translate the source code and/or high-level circuit description to physical machine-executable instructions and/or physical circuits that when executed/operated perform the equivalent of the features described with the mathematical language/notation. In short, this application is directed to physical instructions/circuitry capable of efficiently securing communications exchanged between devices as set forth with mathematical language/notation to effectively convey to an ordinary engineer how to produce such real-world physical systems to derive the communication benefits thereof.

Figure 1B:
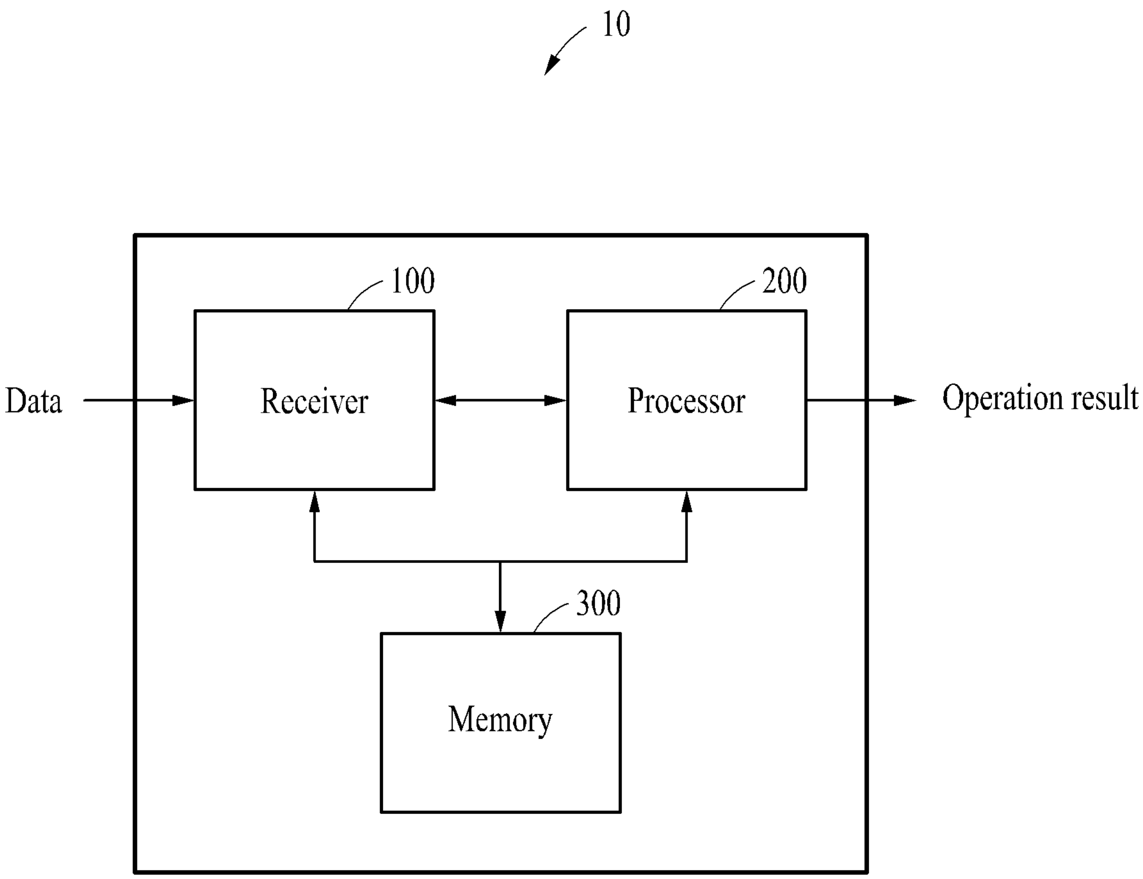
FIG. 1B illustrates an example computing device according to one or more example embodiments.

FIG. 1B illustrates an example computing device according to one or more example embodiments.

A computing device 10 may perform a module learning with errors (MLWE)-based homomorphic encryption operation that supports an operation on a homomorphic ciphertext into which a plaintext including binary numbers is encrypted. The homomorphic encryption operation apparatus 10 may perform an MLWE-based homomorphic encryption operation that supports an operation on a ciphertext into which a plaintext including integers is encrypted. The homomorphic encryption operation apparatus 10 may perform an MLWE-based approximate homomorphic encryption operation that supports an operation on a ciphertext into which a plaintext including real numbers and/or complex numbers is encrypted. The MLWE-based homomorphic encryption operation will be described in detail below with reference to FIGS. 2 to 8. "Supporting" an operation refers to preserving the properties of the homomorphic ciphertext that allow it to be decrypted despite being transformed by the operation.

The computing device 10 may decrypt an operation result obtained from an operation performed on data in an encrypted state using homomorphic encryption to derive the same result as would be obtained from performing the operation on the data in a plaintext state.

The computing device 10 may perform a homomorphic operation on a ciphertext of a plaintext encoded in various forms.

In some embodiments, the computing device 10 may be implemented in the form of chip(s) provided on a hardware accelerator that implements homomorphic encryption. The computing device 10 may be implemented in the form of chip(s) and/or instructions to reduce memory usage of various operation apparatuses. The computing device 10 may reduce the amount of computation used to perform a homomorphic encryption operation and may thereby reduce a total computational amount of a server.

The computing device 10 may be applied to all types of MLWE-based homomorphic encryption schemes and may be implemented in an encryption process for encrypting input values in all devices and services to which homomorphic encryption is applied.

The computing device 10 may include a receiver 100 and a processor 200. The computing device 10 may further include a memory 300.

The receiver 100 may include a receiving interface, e.g., a network interface card, a cellular interface/module, a wireless interface, etc. The receiver 100 may receive data on which a homomorphic encryption operation is to be performed from another device or from the memory 300. The data may include operand data or keys for performing the homomorphic encryption operation. The keys may include a private key (or secret key) and a public key. The public key may include, as non-limiting examples, operation keys such as a key switching key for a key switching operation, a relinearization key, and a module rank reduction key. The receiver 100 may provide the received data to the processor 200.

The processor 200 may process data stored in the memory 300. The processor 200 may execute computer-readable code (e.g., software/instructions) stored in the memory 300 and instructions triggered by the processor 200.

The processor 200 may be a hardware-implemented data processing device including a physically structured circuit to perform desired operations. For example, the desired operations may include code or instructions included in a program.

The hardware-implemented data processing device may include, for example, a microprocessor, a central processing unit (CPU), a processor core, a multi-core processor, a multiprocessor, an application-specific integrated circuit (ASIC), and/or a field-programmable gate array (FPGA). "Processor" as used herein, unless the context suggests to the contrary, refers to one or more processors.

The processor 200 may perform a homomorphic encryption operation based on a ciphertext including multiple modules and on an operation key. As described in detail below, the processor 200 may reduce the number (quantity) of the modules according to a number of remaining available homomorphic operations. As a modulus of the ciphertext decreases in the homomorphic operation process, the processor 200 may reduce the number of modules while still providing the same security level and may thereby reduce a computational amount.

When the modulus of the ciphertext changes and becomes less than a preset value, the processor 200 may perform an operation of reducing the number of modules.

The memory 300 may store instructions (or program(s)) executable by the processor 200. The instructions may include, for example, instructions for performing operations of the processor 200 and/or operations of components of the processor 200.

The memory 300 may be implemented as volatile and/or non-volatile memory device(s).

In the case of a volatile memory device, such device may be implemented as a dynamic random-access memory (DRAM), a static RAM (SRAM), a thyristor RAM (T-RAM), a zero capacitor RAM (Z-RAM), or a twin transistor RAM (TTRAM), for example.

In the case of a non-volatile memory device, such device may be implemented as an electrically erasable programmable read-only memory (EEPROM), a flash memory, a magnetic RAM (MRAM), a spin-transfer torque-MRAM (STT-MRAM), a conductive bridging RAM (CBRAM), a ferroelectric RAM (FeRAM), a phase change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory, for example.

Figure 2:
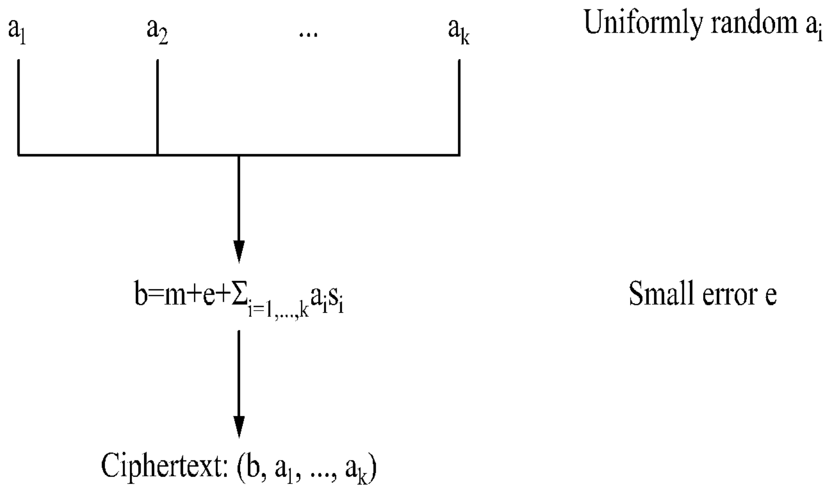
FIG. 2 illustrates an example of ciphertext generation according to one or more example embodiments.

FIG. 2 illustrates an example of ciphertext generation according to one or more example embodiments.

Referring to FIG. 2, a client (e.g., the client 110 of FIG. 1A) according to an example embodiment may generate a ciphertext including a plurality of modules. Accordingly, the client may set parameters according to the required number of homomorphic operations (the required number of homomorphic operations will also be referred to hereinafter as a required homomorphic operation level, and does not refer to a number of different types of operations).

For example, the client may encode a message z ($z \in C^l$, $l|N$, $l \leq N/2$, C denotes a complex number domain) to be encrypted, according to Equation 1.

$$m = \text{Round}(\Delta Emb(z)),\ m \in R_q \qquad \text{Equation 1}$$

The encoding map a message in the complex number domain into a polynomial. The encoding, which is an inverse operation of canonical embedding, may be $Emb(m)_1 = m(\zeta^i)$, in which ζ is a root of unity, and the round operation is an operation of rounding to the nearest element of R_q. Δ is a large integer and may be referred to as a scaling factor. The encoding method, however, is not limited to the foregoing. For example, although encoding a message in the form of a complex number has been described, the encoded form of the message may be a real number.

The client may encrypt the encoded message m and generate a ciphertext $(b, a_1, \ldots a_k)2\in$ $$(b, a_1, \ldots a_k)\ 2 \in R_q^{k+1}$$

that satisfies Equation 2.

$$b = m + e - \sum a_i s_i \qquad \text{Equation 2}$$

In Equation 2, $a_i$, which is a module of a ciphertext, may be randomly generated in the form of an N−1 order polynomial, $s_1, \ldots, s_k$ denotes a secret key, and may also be in the form of an N−1 order polynomial.

In the case of ring learning with errors (RLWE)-based homomorphic encryption, the number of computable levels (levels of computation) may be determined by a modulus Q of a ciphertext (and possibly only that piece of information). In the RLWE-based homomorphic encryption, a polynomial order N may have the form of a power of 2, and log Q may be proportional to the polynomial order N. Therefore, in the RLWE-based homomorphic encryption, Q may need to be increased to increase the number of times of homomorphic operations and N may need to be forcibly increased by at least twice (i.e., at least doubled) to increase Q, which may be inefficient. Accordingly, when designing a hardware accelerator or the like, a number theoretic transform (NTT) may need to be performed on a polynomial with a large order, which may raise an inefficiency issue.

In the MLWE-based homomorphic encryption scheme according to an example embodiment, unlike the RLWE-based homomorphic encryption scheme, parameters may not be determined according to the polynomial order N; a small positive integer k (k denoting the number of modules) may be introduced and (N, k) may become a main parameter, and (N, k, Q) may be determined according to the required homomorphic operation level and desired security level.

That is, the number of computable levels may be determined by the modulus Q, and Q may be determined by a combination of N and k, and thus the size of N may be reduced, compared to the RLWE-based homomorphic encryption, which may enable more flexible parameter selection and hardware design. For example, the log of Q may need to be proportional to a total length of k polynomials of order N−1, and thus a change in the total size of ciphertext according to the required Q may not be large. In addition, a value of the modulus Q may be determined by the combination of N and k, and thus a value of Q may be set more precisely.

The client may transmit the ciphertext to a server (e.g., the server 120 of FIG. 1A), and the server may perform various operations on the ciphertext in an encrypted state. The client may decrypt the ciphertext again according to Equation 3.

$$m \approx b + \sum a_i s_i \quad \text{Equation 3}$$

The client may then perform decoding, which is an inverse operation of the above-mentioned encoding, to obtain the same/original plaintext but transformed as per the operation result.

Figure 3:
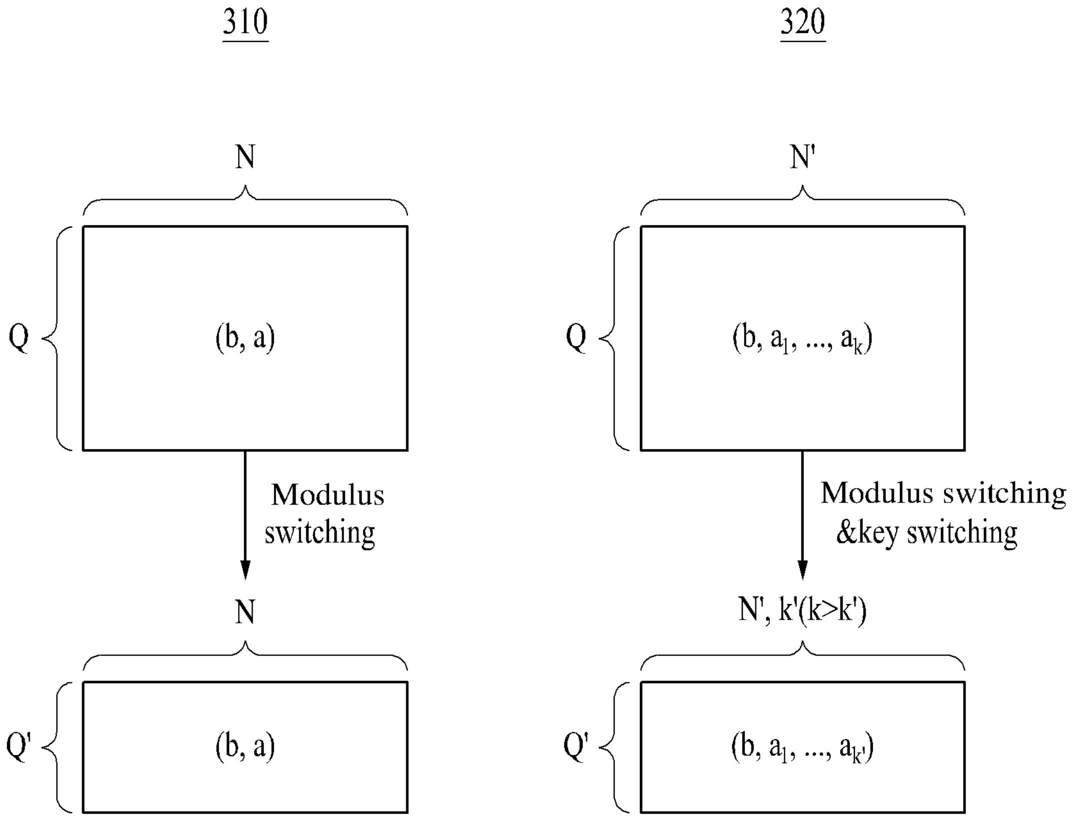
FIG. 3 illustrates an example of a modulus reduction operation according to one or more example embodiments.

FIG. 3 illustrates an example of performing a modulus reduction operation according to one or more example embodiments.

Referring to FIG. 3, left portion 310 illustrates an operation method for reducing a modulus in a typical RLWE-based homomorphic encryption, and right portion 320 illustrates an operation method for reducing a modulus according to an example embodiment of the present disclosure.

A homomorphic encryption operation may employ a modulus-change operation. For example, when a homomorphic encryption operation is performed, the available number of times of performance of homomorphic operations may decrease. In this case, an operation for reducing a modulus (or a modulus reduction operation herein) may be used to increase the available number of times of homomorphic operations.

Referring to the left portion 310, even when a modulus of an RLWE-based ciphertext (b, a) including two N-order polynomials is changed from Q to Q*, the size of the ciphertext may not be changed, and there may be no way to change the size of the ciphertext.

However, referring to the right portion 320, a homomorphic encryption operation apparatus (or computing device) according to some embodiments may reduce the number k of modules according to the remaining available number of times of performing homomorphic operations and provide a less computational amount. For example, when a modulus of an MLWE-based ciphertext ($b, a_1, \ldots a_k$) including k N'-order polynomials is changed from Q to Q*, the homomorphic encryption operation apparatus may change the number of modules of the ciphertext from k to k*.

Figure 4:
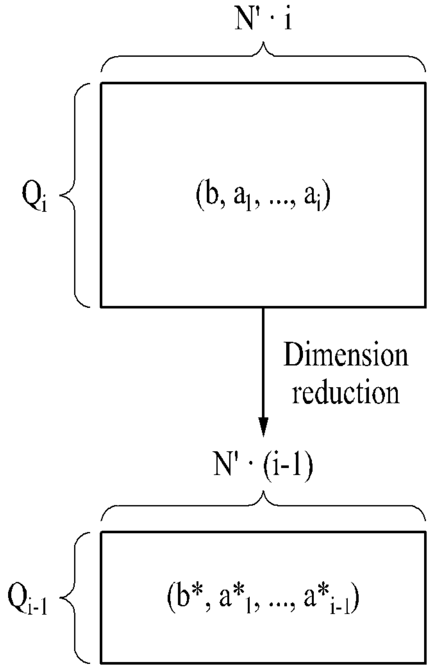
FIG. 4 illustrates an example of a module number reduction operation according to one or more example embodiments.

FIG. 4 illustrates an example of performing a module number reduction operation according to one or more example embodiments.

Referring to FIG. 4, a computing device according to some embodiments may perform an operation of reducing the number of modules (or a module number reduction operation herein) when a modulus of a ciphertext is changed to a preset value or less. For example, the homomorphic encryption operation apparatus may reduce the number of modules from i to i−1 when a value of Q after a homomorphic encryption operation is lower than $Q_{i-1}$.

A security level may be inversely proportional to the modulus Q. For example, when the modulus Q decreases as the homomorphic encryption operation proceeds, the security level may increase. In contrast, the security level may be inversely proportional to the number i of modules. Accordingly, the computing device may reduce the number i of modules in proportion with an increase in the security level, and may do so in response to a decrease in the modulus Q that emerges as the homomorphic encryption operation proceeds. Therefore, the computing device may perform an operation with a ciphertext having a small size while maintaining security.

At the security level with the same security parameter value, under the assumption that (N, k, Q)=(N', i, $Q_i$), (N', i−1, $Q_{i-1}$), when a secret key of a ciphertext prior to a homomorphic operation is sk=($s_1, s_2, \ldots, s_{i-1}$) and a secret key of the ciphertext after the operation is sk'=($s_1, s_2, \ldots, s_{i-1}$), a module rank reduction key $$MLWE'_{sk'}(s_j)$$

may be used to obtain an MLWE ciphertext with a ring dimension whose size is reduced than the existing one (having the secret key sk') and accelerate a ciphertext operation.

Figure 5:
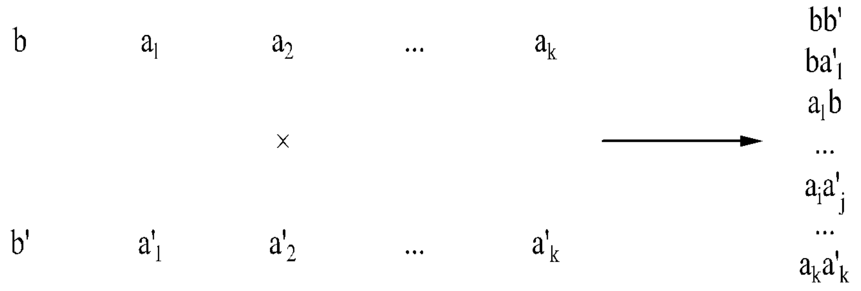
FIG. 5 illustrates an example of ciphertext multiplication according to one or more example embodiments.

FIG. 5 illustrates an example of ciphertext multiplication according to one or more example embodiments.

Referring to FIG. 5, for ciphertexts ($b, a_1, \ldots a_k$) and ($b', a_1', \ldots a_k'$) of m and m', $$mm' \approx \left(b + \sum a_i s_i\right)\left(b' + \sum a'_i s_i\right)$$

is satisfied, and thus $$\left(bb', ba'_1 + a_1 b', \ldots, a_i a'_j + a_j a'_i, \ldots, a_k a'_k\right)$$

may be a ciphertext of mm' for a secret key $$\left(1, s_1, s_1^2, \ldots, s_i s_j, \ldots, s_k s_k\right).$$

When a multiplication operation is performed on a ciphertext, items having square values may be naturally generated, and thus a relinearization operation may be called for. Accordingly, a homomorphic encryption operation apparatus may obtain a ciphertext having a secret key ($s_1, s_2, \ldots, s_k$), using a relinearization key MLWE' ($s_i s_j$) received from a client.

Figure 6:
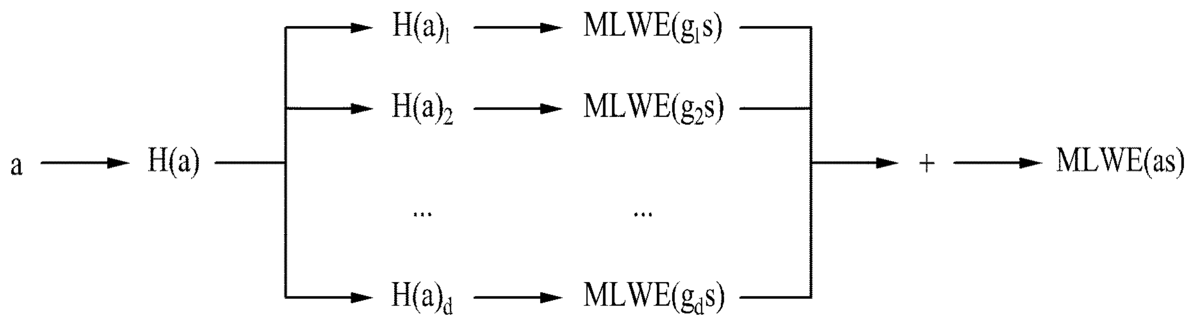
FIG. 6 illustrates an example of a gadget decomposition-based multiplication operation according to one or more example embodiments.

FIG. 6 illustrates an example gadget decomposition-based multiplication operation method according to one or more example embodiments.

Referring to FIG. 6, a computing device according to an example embodiment may reduce a relinearization operation through gadget decomposition. For example, the homomorphic encryption operation apparatus may reduce a complexity of O($k^2$) to a complexity O(k) having MLWE'($s_j$) for an operation speed through gadget decomposition.

G=(g1, . . . gd) may be referred to as a gadget vector, and a pair corresponding thereto, a gadget decomposition H, may be defined as expressed by Equation 4.

$$H: R_q \rightarrow R_q^d, H(a) \text{ has small size, i.e., } |H(a)|_\infty < B \text{ for some bound } B, \text{ and } H(a) * g = a \quad \text{Equation 4}$$

In Equation 4, the criterion for size may not be limited to an infinity norm. When there are d MLWE ciphertexts, i.e., {MLWE ($g_i$s)}_(i=1, . . . d)=MLWE' (s), the computing device may multiply each element of H (a) and MLWE' (s) and add them to obtain MLWE (as) for $a \in R_q$. In this case, MLWE (as) may have a small value for which an error is adjusted by B. Using this, the homomorphic encryption operation apparatus may perform a general RLWE automorphic operation or relinearization operation.

Figure 7:
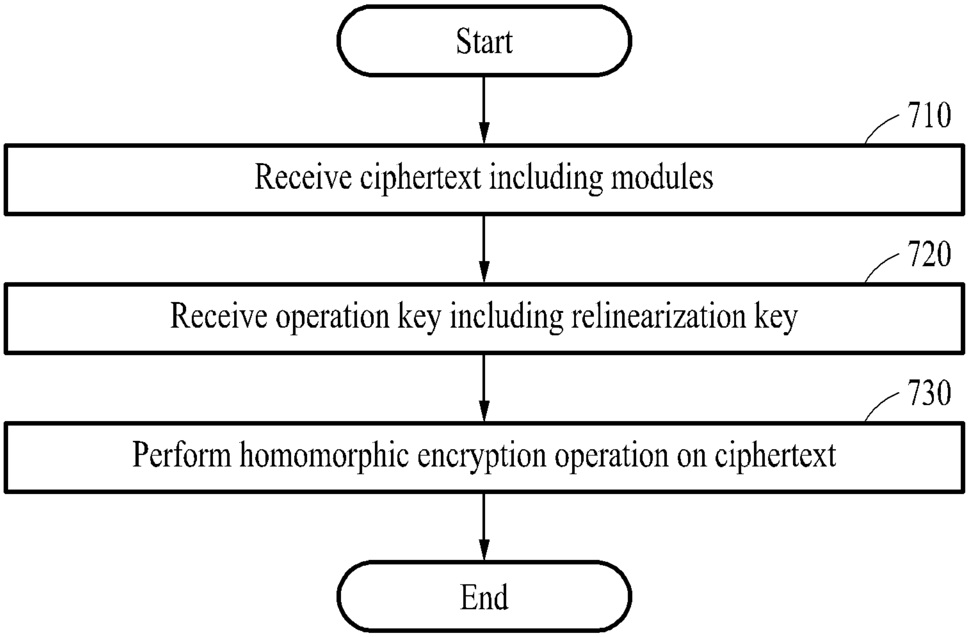
FIG. 7 illustrates an example homomorphic encryption operation according to one or more example embodiments.

FIG. 7 illustrates an example homomorphic encryption operation method according to one or more example embodiments.

For the convenience of description, operations 710 to 730 described below may be performed using the computing device 10 described above with reference to FIG. 1B. However, operations 710 to 730 may also be performed by another suitable electronic device in any suitable system.

Referring to FIG. 7, in operation 710, the computing device 10 may receive a ciphertext including multiple modules. In operation 720, the computing device 10 may receive an operation key including a relinearization key.

In operation 730, the computing device 10 may perform a homomorphic encryption operation on the ciphertext. In this case, a modulus of the ciphertext may be determined based on the dimension of the modules and the number of the modules (how many modules there are).

The computing device 10 may perform an operation of changing a ciphertext (b, $a_1$, . . . $a_k$) on a first modulus (e.g., Q) to a ciphertext on a second modulus (e.g., Q*). The computing device 10 may determine the number k* of modules corresponding to the second modulus (e.g., Q*), and change the ciphertext (b, $a_1$, . . . $a_k$) on the first modulus to the ciphertext $$(b^*, a_1^*, \ldots a_k^{**})$$

on the second modulus based on the second modulus, the dimension of the plurality of modules, and the number of modules. The computing device 10 may determine the number of modules corresponding to the second modulus based on the dimension of the plurality of modules. The second modulus (e.g., Q*) may be determined based on the dimension of the plurality of modules and the number k* of the modules, and thus the computing device 10 may determine the number of the modules corresponding to the second modulus based on the dimension of the modules.

When the modulus of the ciphertext is changed to a preset value or less, the computing device 10 may perform an operation of reducing the number of modules. The computing device 10 may receive a module rank reduction key and change a secret key corresponding to the ciphertext based on the module rank reduction key. In this case, the computing device 10 may perform an operation of reducing the number of components constituting the secret key.

Figure 8:
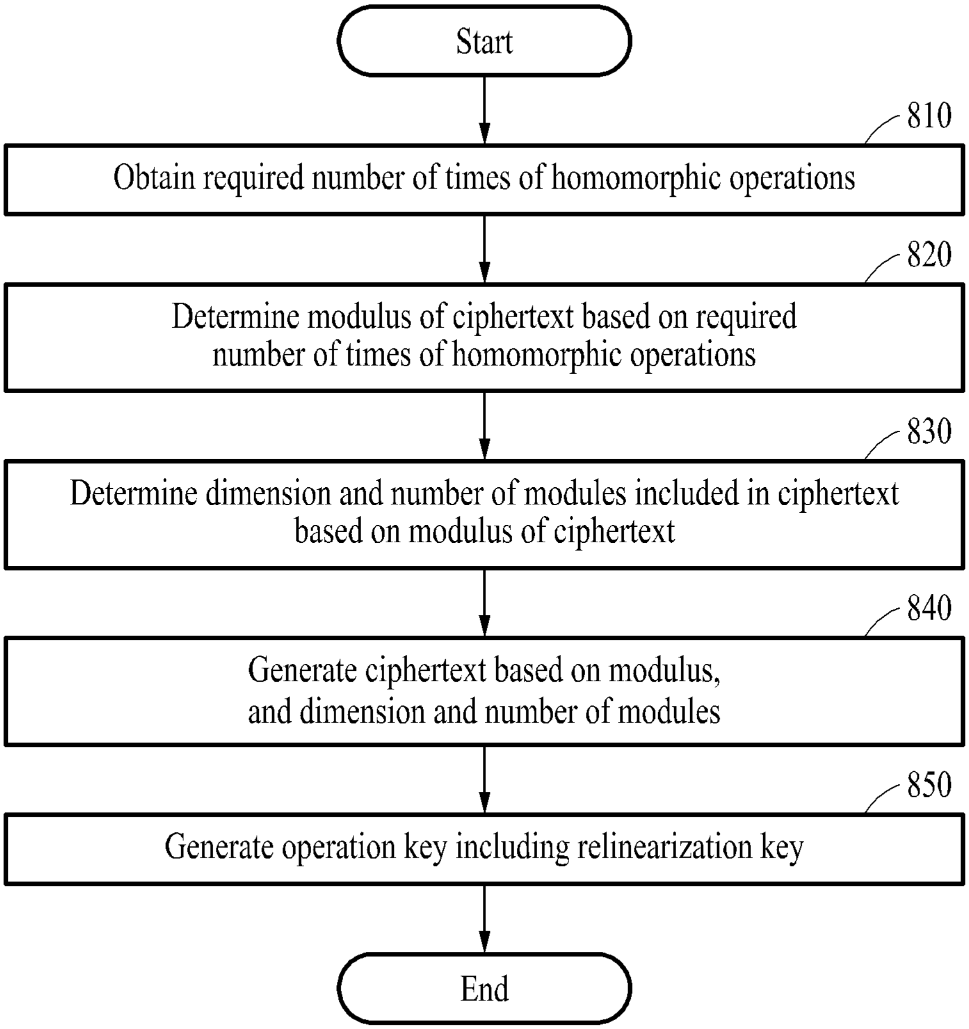
FIG. 8 illustrates an example ciphertext generation method according to one or more example embodiments.

FIG. 8 illustrates an example ciphertext generation method according to one or more example embodiments.

For the convenience of description, operations 810 to 850 described below may be performed using the client 110 described above with reference to FIG. 1B. However, operations 810 to 850 may also be performed by another suitable electronic device in any suitable system.

Referring to FIG. 8, in operation 810, the client 110 may obtain a required number of times of performing homomorphic operations.

In operation 820, the client 110 may determine a modulus of a ciphertext based on the obtained required number of times of performing homomorphic operations. The client 110 may flexibly select parameters according to the required number of times of performing homomorphic operations.

In operation 830, the client 110 may determine the dimension and the number of modules included in the ciphertext based on the modulus of the ciphertext.

In operation 840, the client 110 may generate a ciphertext based on the modulus, the dimension of the plurality of modules, and the number of the plurality of modules.

In operation 850, the client 110 may generate an operation key including a relinearization key.

The computing apparatuses, the electronic devices, the processors, the memories, the cryptographic devices/techniques, the information output system and hardware, the storage devices, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of performing a module learning with errors (MLWE)-based homomorphic encryption operation by a computing device comprising processing hardware and storage hardware, the method comprising:

receiving, and storing in the storage hardware, a ciphertext comprising modules conforming to an MLWE homomorphic encryption scheme, wherein a plaintext is encrypted into the ciphertext;

receiving, and storing in the storage hardware, an operation key comprising a relinearization key corresponding to the ciphertext; and performing, by the processing hardware, the MLWE-based homomorphic encryption operation on the ciphertext, wherein, in support of the MLWE-based homomorphic encryption operation, a modulus of the ciphertext is reduced by the processing hardware based on a dimension of the modules and a number of the modules.

2. The MLWE-based homomorphic encryption operation method of claim 1, wherein the performing the MLWE-based homomorphic encryption operation comprises:

changing a ciphertext on a first modulus to a ciphertext on a second modulus.

3. The MLWE-based homomorphic encryption operation method of claim 2, wherein the changing the ciphertext comprises:

determining a number of modules corresponding to the second modulus; and changing the ciphertext on the first modulus to the ciphertext on the second modulus based on the second modulus, the dimension of the modules, and the number of the modules.

4. The MLWE-based homomorphic encryption operation method of claim 3, wherein the determining the number of the modules corresponding to the second modulus is based on the dimension of the modules.

5. The MLWE-based homomorphic encryption operation method of claim 1, wherein the performing the MLWE-based homomorphic encryption operation on the ciphertext comprises:

based on determining that the modulus of the ciphertext has changed to a preset value or less, performing an operation of reducing the number of the modules.

6. The MLWE-based homomorphic encryption operation method of claim 5, wherein the receiving the operation key comprises:

receiving a module rank reduction key, and wherein the performing the operation of reducing the number of the modules comprises:

changing a secret key corresponding to the ciphertext based on the module rank reduction key.

7. The MLWE-based homomorphic encryption operation method of claim 6, wherein the changing the secret key comprises:

performing an operation of reducing the number of components constituting the secret key.

8. A MLWE-based homomorphic encryption operation method performed by a computing device, the method comprising:

obtaining a required number of times of performing MLWE-based homomorphic operations for a homomorphically encrypted ciphertext that conforms to an MLWE-based homomorphic encryption scheme, wherein a plaintext is encrypted into the ciphertext;

in support of the MLWE-based homomorphic encryption operation, reducing a modulus of the ciphertext based on the required number of times of performing the MLWE-based homomorphic operations;

determining a dimension of modules comprised in the ciphertext and a number of the modules, based on the modulus of the ciphertext;

generating the ciphertext based on the modulus, the dimension of the modules, and the number of the modules; and generating an operation key comprising a relinearization key.

9. The MLWE-based homomorphic encryption operation method of claim 8, wherein the generating the ciphertext comprises:

encoding a message to be encrypted; and homomorphically encrypting the encoded message.

10. The MLWE-based homomorphic encryption operation method of claim 9, wherein the encoding comprises:

mapping the message, which is in a complex number domain, to a polynomial.

11. The MLWE-based homomorphic encryption operation method of claim 8, wherein the method further comprises reducing the computation needed to perform the MLWE-based homomorphic encryption operation by reducing the number of the modules.

12. A computing device, comprising:

one or more processors; and memory storing instructions configured to, when executed by the one or more processors, cause the computing device to:

access a ciphertext comprising modules and an operation key comprising a relinearization key, the ciphertext conforming to an MLWE-based homomorphic encryption scheme, wherein a plaintext is encrypted into the ciphertext; and perform an MLWE-based homomorphic encryption operation on the ciphertext, wherein, in support of the MLWE-based homomorphic encryption operation, a modulus of the ciphertext is reduced based on a dimension of the modules and a number of the modules.

13. The computing device of claim 12, wherein the instructions are further configured to cause the computing device to:

perform an operation of changing a ciphertext on a first modulus to a ciphertext on a second modulus.

14. The computing device of claim 13, wherein the instructions are further configured to cause the computing device to:

determine a number of modules corresponding to the second modulus; and change the ciphertext on the first modulus to the ciphertext on the second modulus based on the second modulus, the dimension of the modules, and the number of the modules.

15. The computing device of claim 14, wherein the instructions are further configured to cause the computing device to:

determine the number of the modules corresponding to the second modulus based on the dimension of the modules.

16. The computing device of claim 12, wherein the instructions are further configured to cause the computing device to:

based on determining that the modulus of the ciphertext has changed to being less than a preset value, perform an operation of reducing the number of the modules.

17. The computing device of claim 16, wherein the instructions are further configured to cause the computing device to:

receive a module rank reduction key, and change a secret key corresponding to the ciphertext based on the module rank reduction key.

18. The computing device of claim 17, wherein the instructions are further configured to cause the computing device to:

perform an operation of reducing the number of components constituting the secret key.

* * * * *